US006956702B2

(12) United States Patent
Pate

(10) Patent No.: US 6,956,702 B2
(45) Date of Patent: Oct. 18, 2005

(54) PROJECTOR WITH SPECTRAL FILTER

(75) Inventor: Michael A Pate, Tuscon, AZ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 5 days.

(21) Appl. No.: 10/423,371

(22) Filed: Apr. 23, 2003

(65) Prior Publication Data

US 2004/0212895 A1 Oct. 28, 2004

(51) Int. Cl.[7] ................................................ G02B 27/14

(52) U.S. Cl. ....................... 359/634; 359/629; 359/589; 353/31

(58) Field of Search ......................... 359/618, 629–630, 359/634, 891, 498, 587, 579, 589, 722, 724

(56) References Cited

U.S. PATENT DOCUMENTS

| | | | | |
|---|---|---|---|---|
| 4,583,822 A | | 4/1986 | Southwell | |
| 4,707,611 A | | 11/1987 | Southwell | |
| 4,826,267 A | | 5/1989 | Hall et al. | |
| 4,952,025 A | | 8/1990 | Gunning, III | |
| 5,000,575 A | | 3/1991 | Southwell et al. | |
| 5,009,485 A | | 4/1991 | Hall | |
| 5,548,422 A | * | 8/1996 | Conner et al. | 349/98 |
| 5,682,212 A | * | 10/1997 | Maurer et al. | 349/5 |
| 5,738,426 A | * | 4/1998 | Daijogo et al. | 353/31 |
| 6,010,756 A | | 1/2000 | Gasworth | |
| 6,021,001 A | | 2/2000 | Turner | |
| 6,222,970 B1 | | 4/2001 | Wach et al. | |
| 6,256,148 B1 | | 7/2001 | Gasworth | |
| 6,297,907 B1 | * | 10/2001 | Wang | 359/585 |
| 2002/0163526 A1 | | 11/2002 | Haseltine et al. | |

FOREIGN PATENT DOCUMENTS

| | | |
|---|---|---|
| EP | 0562828 A1 | 9/1993 |
| EP | 0623833 A1 | 11/1994 |
| WO | WO 93/19393 | 9/1993 |
| WO | WO 99/36258 | 7/1999 |

OTHER PUBLICATIONS

Abstract: W.E Johnson; "Color Neutral Rugate Filters," SPIE Proceedings vol. 2046, pp. 132–140, 1993.

Webb–page: Barr Associates, Inc.: "Innovators in Optical Filter Technology", Jan. 2001.

Pr ss Releas : Rockwell Automation, Inc.; "Microvision t Join Optical Display Consortium," 2002.

Web–page: Rockwell Scientific, "Imaging and Optics", Mar. 2000.

A. Macleod; "Optical Coating Technology," Business Briefing: Global Photonics Applications & Technology, 2002.

R.C. Johnson; "Silicon nanoparticles eyed for chemical detection", EE Times, Sep. 10, 2002.

* cited by examiner

*Primary Examiner*—Hung Xuan Dang
*Assistant Examiner*—Joseph Martinez

(57) ABSTRACT

A projector projects pixels to form an image in accordance with image data. The projector includes a modulator which modulates light from a light source and outputs projected pixels in a plurality of color spectral bands. The projector has a light source with a non-uniform spectral power distribution with spectral energy within each of the plurality of color spectral bands. A first notch filter removes spectral energy from a first spectral range within a first color spectral band to improve gamut.

11 Claims, 8 Drawing Sheets

PROJECTOR WITH SPECTRAL FILTER

BACKGROUND OF THE DISCLOSURE

A projector projects light from a light source as modulated by a spatial light modulator or object to form an image on a viewing surface. The image is made up of pixels spatially arranged to form an image. Each pixel is created with color characteristics such that an image formed by the properly spatially arranged pixels corresponds to an image represented in image data. The pixels are made up of a plurality of projected pixels that are spatially or temporally combined to give the pixel the desired color characteristics. The projected pixels are created in a plurality of colors, typically blue, green and red or blue, green, red and white.

The range of colors that can be represented by combining projected pixels of given colors is known as the gamut. In an idealized projector, the projected pixels might be mono-chromatic, single-wavelength primary colors, for instance, blue, green and red. These colors would combine to make all of the colors possible using the mono-chromatic primary colors.

In reality, projected pixels are not typically monochromatic, but include spectral energy within a spectral band corresponding to the desired color. For instance, blue, green and red projected pixels in a projector could each include light with a spectral power distribution within a color spectral band. For example, a blue spectral band can be centered at about 450 nm, a green spectral band can be centered at about 550 nm and a red spectral band can be centered at about 700 nm. The color spectral bands can be, for example, about 80 nm wide. The color spectral bands of projected pixels of a given projector are generally determined by the characteristics of the specific modulator used with the projector.

A light source for a projector has a characteristic spectral energy distribution. The light includes energy at a range of frequencies distributed throughout the visible spectrum. The modulator will permit light from the light source falling within a particular color spectral band to be included in projected pixels of that color. The spectral power distribution of light in the projected pixel will correspond to the spectral power distribution of the light source within that spectral band.

Where color projected pixels are not mono-chromatic, but have spectral power distributions within the color spectral bands, the gamut is less than optimal. This is because each projected pixel alone corresponds to a mix of colors at frequencies distributed throughout the spectral band. The gamut is correspondingly smaller.

BRIEF DESCRIPTION OF THE DRAWINGS

These and other features and advantages of the invention will readily be appreciated by persons skilled in the art from the following detailed description of an exemplary embodiment thereof, as illustrated in the accompanying drawings, in which.

DETAILED DESCRIPTION OF THE DISCLOSURE

Figure 1:
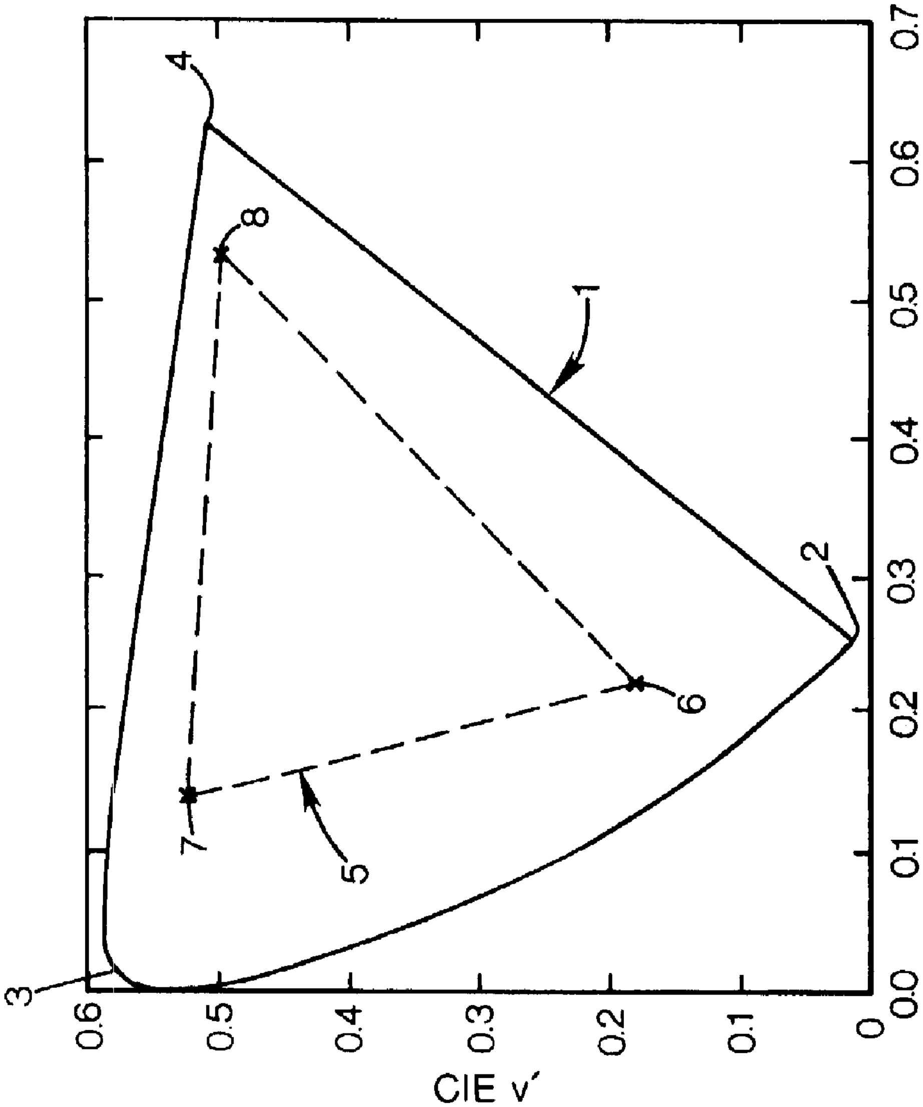
FIG. 1 is a chromaticity diagram showing the relative gamuts of projector with idealized mono-chromatic projected pixels and a projector with projected pixels with broadband spectral distribution of colors distributed throughout each color spectral band.

In the following detailed description and in the several figures of the drawing, like elements are identified with like reference numerals.

A light source for a projector has a spectral power distribution. The spectral power distribution has energy distributed throughout the visible spectrum. A modulator modulates light from the light source to output pixels, the pixels comprising projected pixels in a plurality of color spectral color bands, typically blue, green and red and may include a white pixel.

FIG. 1 is a chromaticity diagram. An idealized projector with mono-chromatic primary color projected pixels would have an idealized gamut 1. The idealized projector would be able to produce all colors within the approximately triangular area with corners at the mono-chromatic blue, green and red primary colors 2–4. The approximate gamut for an exemplary non-uniform light source includes colors within the approximately triangular area 5 with corners at the non-monochromatic blue, green and red color spectral bands 6–8.

Filtering out all but a very narrow range of color centered about the monochromatic primary colors would increase the gamut but would reduce the intensity of the projected image. A device for improving the gamut available from a given light source is desired. A device for improving the gamut available from a given light source while maintaining brightness is also desired.

Figure 2:
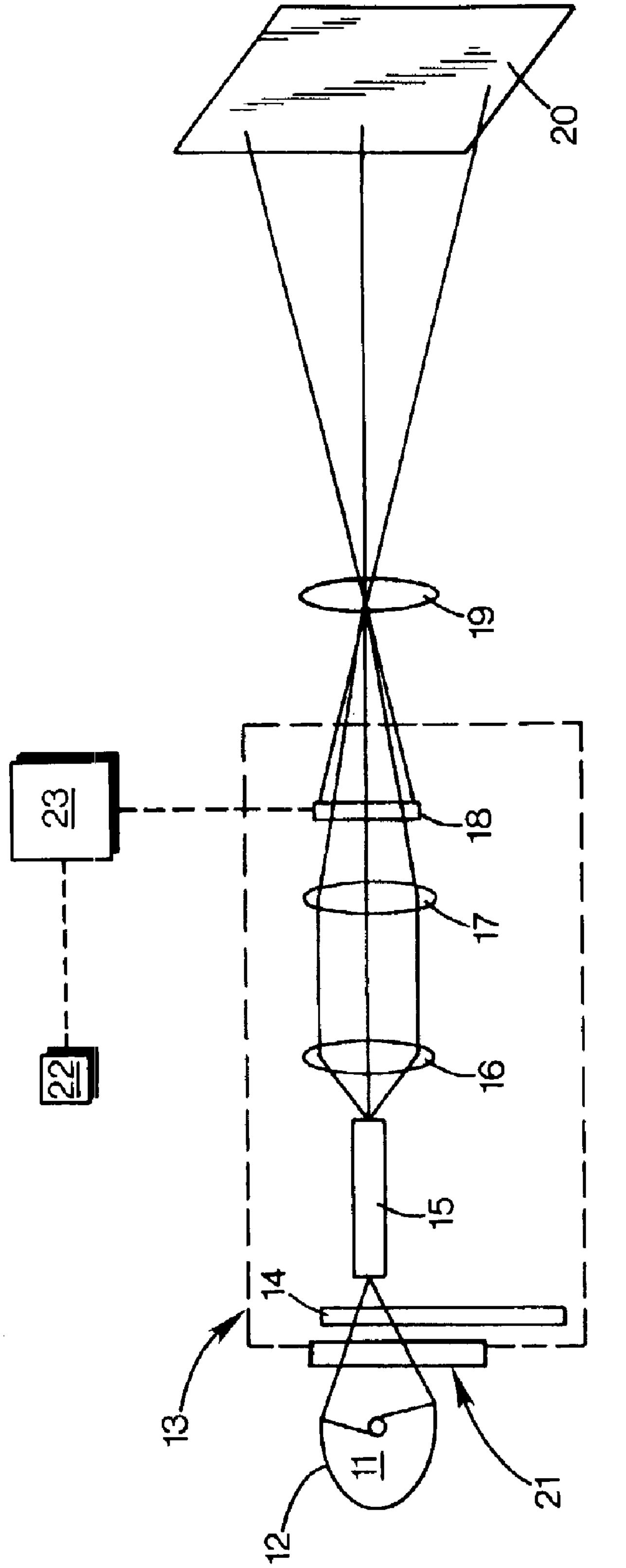
FIG. 2 is diagram of an unfolded optical path of an exemplary digital projector.

FIG. 2 shows an unfolded light path of an exemplary embodiment of a projector. A light source 11 emits light. A mirror 12, which can be an elliptical mirror, directs the light toward the modulator 13. An exemplary embodiment of the projector includes a modulator (or light engine) 13 with a filter wheel 14 with a plurality of filters, for example four, which sequentially permit spectral bands for projected pixels to pass through the wheel. The projected pixels may have blue, green, red and white spectral bands. In this exemplary embodiment, an integrating rod 15 spatially homogenizes the light and a condenser lens 16 directs the light toward a relay lens 17, which uniformly illuminates a spatial light modulator 18. The spatial light modulator may be a pulse width modulator—which adjusts the apparent brightness of a projected pixel by adjusting the time in which the projected pixel is on. A lens 19 directs the spatially modulated light onto an image surface 20. Persons of skill in the art will appreciate that the modulator can be any type of modulator suitable for modulating light from a light source into pixels comprising projected pixels to form an image in accordance with image data. Suitable modulators include modulators based on digital micro-mirror devices (DMD), liquid crystal display (LCD) or transmissive or reflective LCD on silicon (LCOS), diffractive based modulators or interference based modulators.

Figure 3:
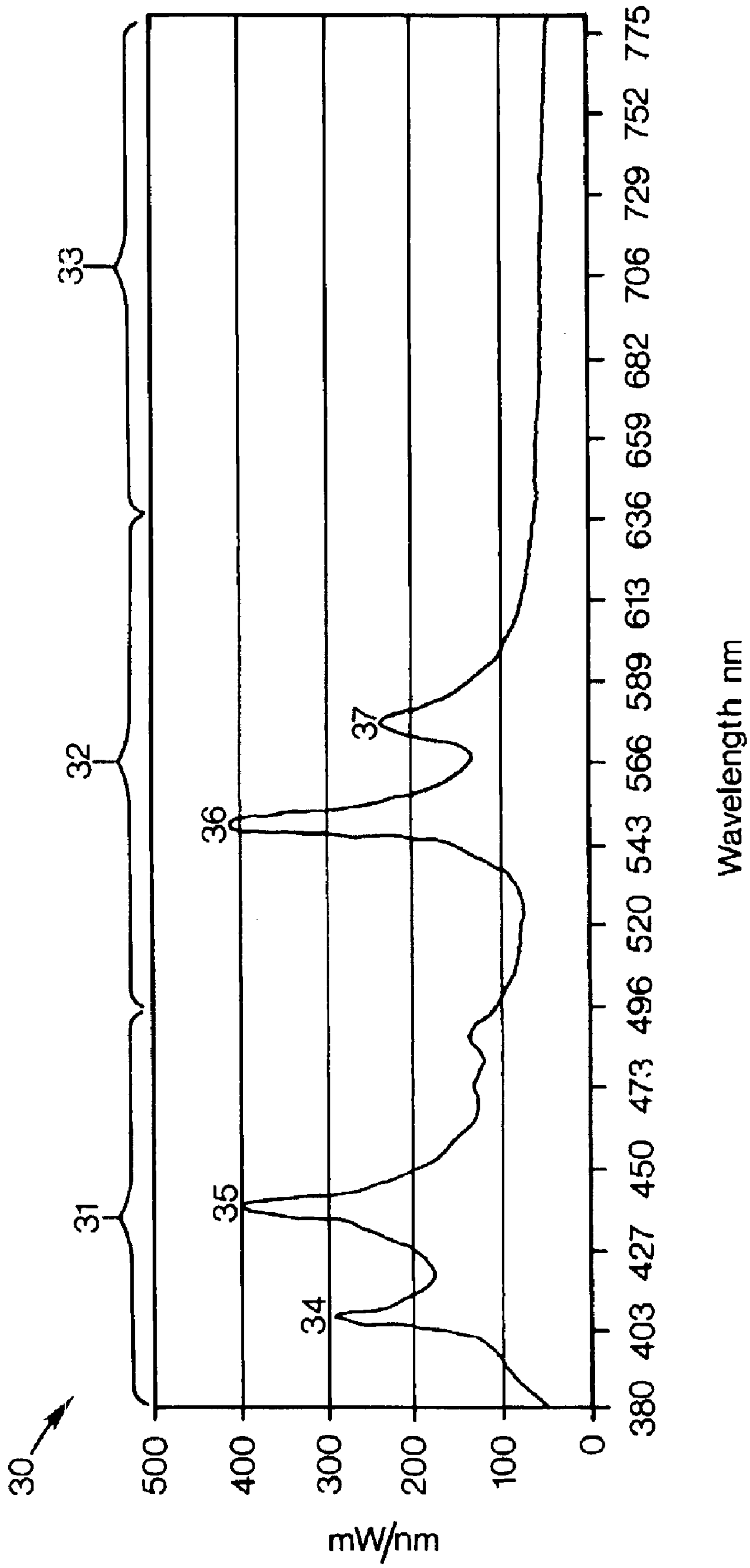
FIG. 3 is a spectral power density curve of an exemplary ultra-high pressure mercury light source.

FIG. 3 shows the spectral power distribution 30 of an exemplary light source. The spectral power distribution 30 of the light source is non-uniform and includes energy in each of the plurality of color spectral bands 31–33. The spectral power distribution 30 is non-uniform within each of the color spectral bands 31–33. The non-uniformity of the spectral range of the projected pixel corresponds to the non-uniformity of the light source within the corresponding color spectral band. The spectral power distribution of the light source may include one or more spikes 34–37 in one or more color spectral bands 31–32 and may be deficient in at least one of the color spectral bands 33.

An exemplary light source may be an ultra-high pressure mercury arc lamp. The spectral power distribution 30 is not uniform. The exemplary spectral power distribution 30 shown in FIG. 3 shows the characteristic spectral power distribution of an ultra-high pressure mercury arc lamp. The spectrum 30 includes several spectral spikes 34–37. First and second blue spikes 34–35 are located in the blue spectral band 31 at about 405 nm and 436 nm, respectively. First and second green spikes 36–37 are located in the green spectral band 32 at about 567 and 586 nm, respectively. The spectrum is deficient in the red color spectral band 33.

A notch filter 21 (FIG. 2) may be used to precisely remove certain ranges of spectral energy within certain color spectral bands to increase the gamut. The spectral ranges from which energy is to be removed are selected to improve gamut and may be selected to improve gamut while retaining desired brightness.

In the blue spectral band 31 of one exemplary embodiment, removing spectral energy from a spectral range 40 (FIG. 4) with wavelengths higher than the maxima of the two blue spikes 34–35 will shift the weighted spectral distribution of the blue pixels away from green, thereby improving the gamut. Leaving the first blue spike 34 and the portion of the maximum of the second blue spike 35 unfiltered improves gamut while retaining brightness.

In the green spectral band 32, removing spectral energy from a spectral range 41 (FIG. 5) with wavelengths between the first and larger green spike 36 and the second and smaller green spike 37 shifts the weighted spectral distribution of the green pixels toward the first spike and away from the red, thereby improving gamut. Removing spectral energy from a spectral range 41 located between the two spikes 36–37, while leaving the spectral energy of the maxima of the spikes unfiltered, improves gamut while retaining brightness.

In one exemplary embodiment, the blue spectral band 31 has more spectral energy than the green spectral band 32. Both the blue 31 and green 32 spectral bands have more spectral energy than the red spectral band 33. In an exemplary embodiment of the disclosure, it may be desirable to remove more spectral energy from the blue spectral band than from the green spectral band because the blue spectral band has more spectral energy. The spectral energy within a spectral range is proportional to the area below the curve in the spectral power distribution 30 shown in FIG. 3. In this way, gamut can be improved while retaining desired brightness. The red color spectral band may be left alone (i.e. unfiltered) because the spectral power distribution is deficient in red. Although removing spectral energy from portions the red spectral band might improve gamut, it would reduce the already relatively low brightness of the red spectral band to undesirable levels.

Persons of skill in the art will appreciate that the general principles applied with respect to the embodiments discussed herein may be applied to other light sources with non-uniform spectral power distributions. Examples of light sources that could be used in a projector include plasma lamps, xenon arc lamps, HID, high pressure mercury and other plasma sources.

A notch filter 21 with good rejection or low transmission in the notch is provided to remove energy from the spectral power distribution of the light source. A notch filter 21 will preferably have sharp spectral cut-on and cut-off regions. For an exemplary embodiment, the filter is preferably constructed with a reasonable number of layers and sharp spectral internal and external shoulders across the visual spectrum with a reasonable number of layers in two or more bands.

A rugate-type thin film optical filter has suitable cut-on and cut-off characteristics to remove certain spectral bands. Rugate filters provide high transmission in spectral bands to be included in the projected pixel and large rejection in the spectral ranges from which energy is to be removed. Rugate filters combine high optical transmission and rejection of narrow spectral bands to improve color chromaticities, enlarge the color gamut, and achieve desirable white point color temperature. Rugate filters may have very good optical performance over a wide angle of incidence.

Rugate filters may have a gradient in the refractive index of the material as a function of thickness. The gradient may vary sinusoidally as a function of thickness. The gradient index of the thin film enables the creation of spectral notch and bandpass type filters, characterized by step cut-on and cut-off slopes, sharp internal and external corners, and high rejection, which are suitable for use with projectors of this disclosure. The number of layers required to design these type of rugate filters is small relative to the number of layers required in regular homogenious index coatings. Rugate filters also have superior performance characteristics.

Methods of manufacturing gradient index rugate thin films include vacuum chamber deposition techniques with solid and gaseous deposition techniques as described in, for example: U.S. Pat. No. 4,583,822 (Southwell), U.S. Pat. No. 4,707,611 (Southwell), U.S. Pat. No. 4,952,025 (Gunning), U.S. Pat. No. 6,256,148 (Gasworth), U.S. Pat. No. 6,021,011 (Turner), U.S. Pat. No. 6,010,756 (Gasworth). The rugate filter=s steep spectral slopes, sharp internal and external corners, and narrow spectral notches and passbands provide improved optical transmission and optical rejection. This enables the precise removal of spectral bands, including narrow spikes, to improve the color gamut and white point in projected digital images.

An exemplary rugate filter used in exemplary embodiments of the projector may have a fused silica substrate of 1 to 2 mm thickness and 25 mm thickness and 25 mm diameter with an antireflection coating on one side with <+0.5% reflection from 380 to 780 nm. Operational temperature in an optical instrument can be 140 degrees Celsius with a spectral shift of <=0.5 nm.

In a first preferred embodiment, a projector with a mercury arc lamp light source may have a notch filter in the blue projected pixel spectral range. The filter may be a rugate filter. The filter may be a blue notch filter CWL (center wave length) 464 nm BW (band width) @ fwhm (full width half maximum) 36 nm with a transmission average preferably greater than or equal to 96% from 380 to 780 nm. Reflection is preferably greater than or equal to 90% from 449 to 479 nm. The edge slope of the blue notch filter should be from about 6 nm or less from the 90% to the 10% transmission points—the 50% transmission points are 446 and 482 for reference. The short wavelength edge tolerance is 443, 446 and 449 −2/+5 nm in location of the 90%, 50% and 10% transmission points respectively. The long wavelength edge tolerance is 485, 482, 479 +/−7 nm in location of the 90%, 50% and 10% transmission points respectively. The filter will preferably be used at normal incidence with +/−10 degree angle of incidence cone and be optimized for 5 degree angle of incidence. The filter shift with angle of incidence is about 1.8 nm. The filter may be used at an operating temperature of about 140 degrees Celsius and the spectral shift should be less than or equal to 0.5 nm from 20 to 140 degrees Celsius.

Figure 4:
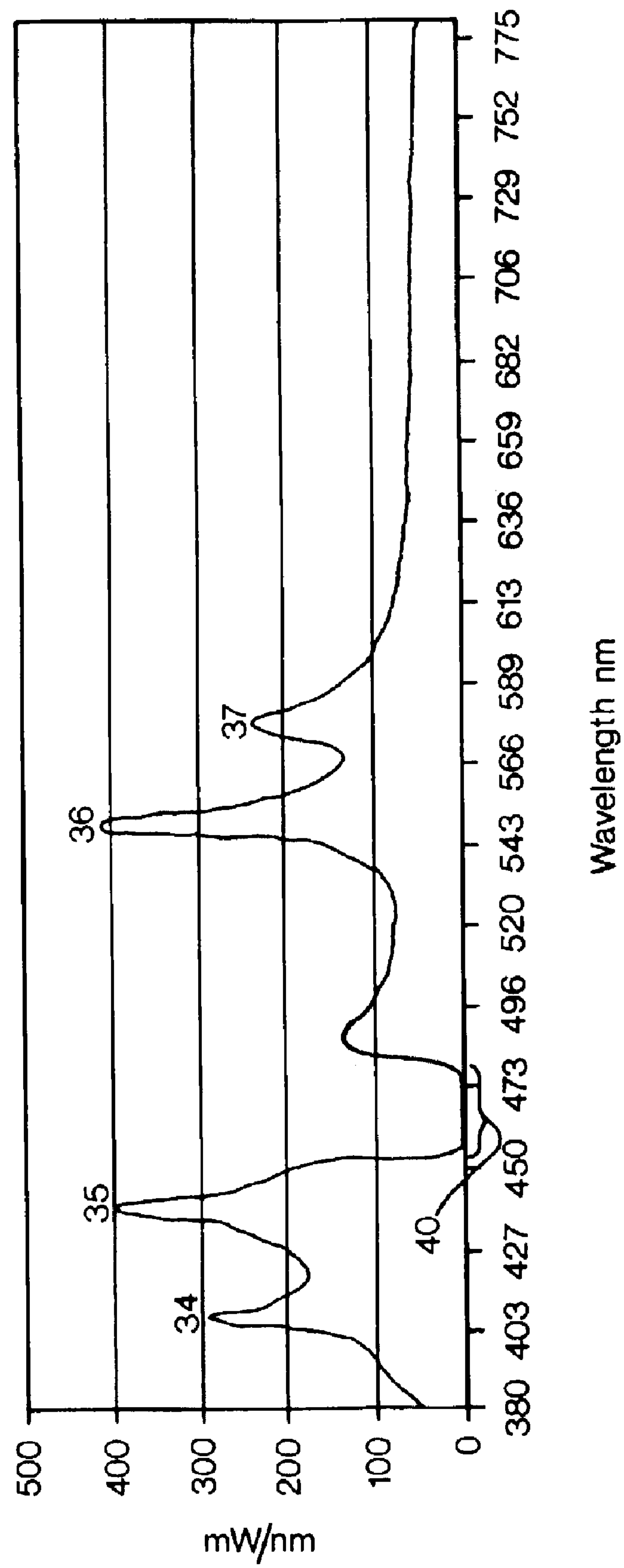
FIG. 4 is a spectral power density curve of a light source filtered by a notch filter of a first embodiment of the disclosure.

FIG. 4 shows the spectrum of an ultra-high pressure mercury arc lamp filtered by a filter of the first preferred embodiment. Spectral energy has been removed in the range 40 of 449 to 479 in the blue spectral band. This shifts the mix of blue in the blue projected pixels closer to the center of the desired blue range. Removing light from the right side of the blue spectral power distribution and leaving the two blue spikes maintains available brightness while improving gamut.

In second preferred embodiment, a projector with a mercury arc lamp light source may have a notch filter in the green projected pixel spectral range. The filter may be a rugate filter. The filter may be a green notch CWL 566 nm BW@fwhm 12 nm. The reflection is preferably greater than or equal to 90% from 563 to 569 nm. The edge slope of the notch should be from 6 nm or less from the 90% to 10% transmission points. The short wavelength edge tolerance is preferably 557, 560, 563 +/−5 nm in location of the 90%, 50% and 10% transmission points respectively. The long wavelength edge tolerance is preferably 575, 572, 569 +/−3 nm in location of the 90%, 50% and 10% transmission points respectively. The green notch filter may be used, for example, at normal incidence with +/−10 degree angle of incidence cone and be optimized for about 5 degree angle of incidence. The filter shift with angle of incidence is about 1.9 nm. The filter may be used at a temperature of about 140 degrees Celsius and the spectral shift is preferably be less than or equal to 0.5 nm from 20 to 140 degrees Celsius.

Figure 5:
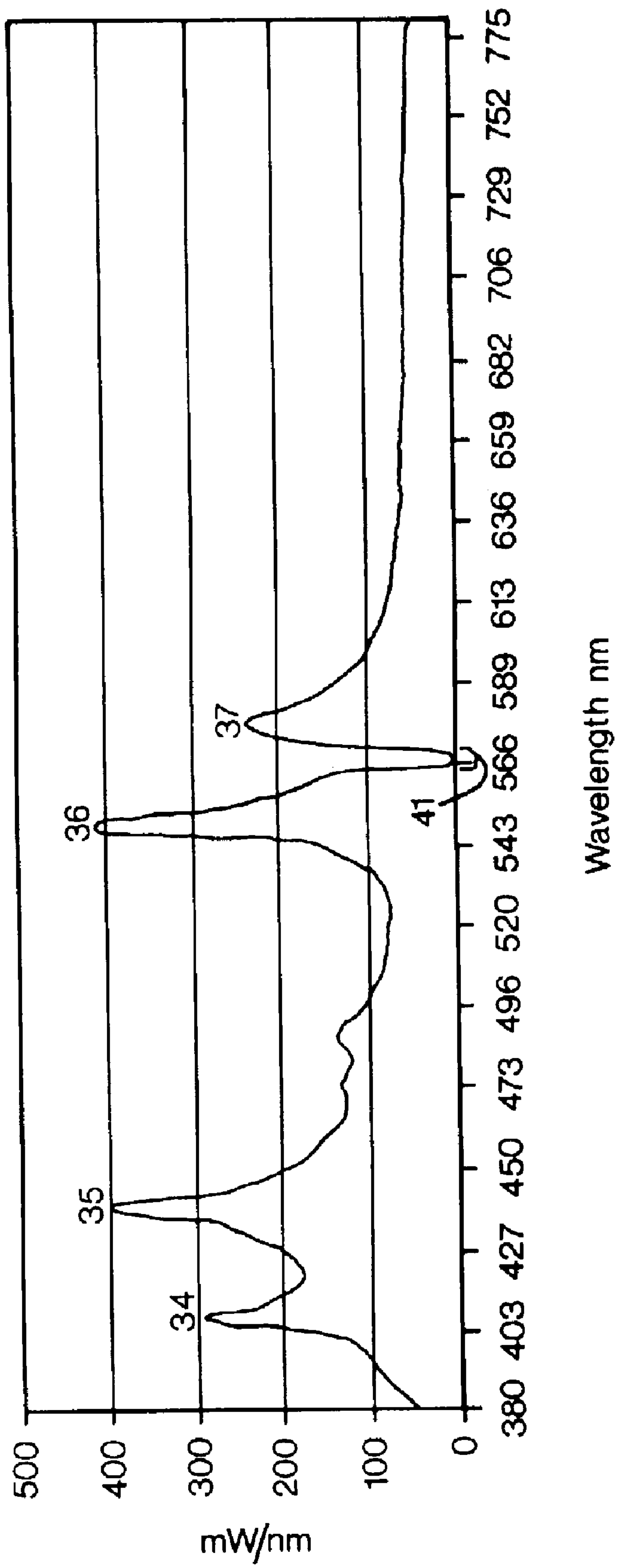
FIG. 5 is a spectral power density curve of a light source filtered by a notch filter of a second embodiment of the disclosure.

FIG. 5 shows the spectral power distribution of an ultra-high pressure mercury arc lamp filtered by a filter of the second embodiment. Spectral energy is removed in the range 41 from 563 to 569 nm. Removing energy on the from the right side of the first green spike improves the gamut. Removing energy from between the two green spikes, while leaving most of the spectral energy associated with the second green spike retains desired brightness.

In a third preferred embodiment, a projector with a mercury arc lamp light source may have a double notch filter with notches in the blue and green spectral ranges. The filter may be a rugate filter. The filter may be a double notch filter. The transmission average is preferably greater than or equal to 96% from 380 to 780 nm. Reflection is greater than or equal to 90% from 449 to 479 nm. Reflection is preferably greater than or equal to 90% from 563 to 569 nm. The edge slope of the notch is preferably 6 nm or less from the 90% to 10% transmission points. The first short wavelength edge tolerance may be 443, 446 and 449 −2/+5 nm in location of the 90%, 50% and 10% transmission points respectively. The first long wavelength edge tolerance is preferably 485, 482, 479 +/−7 nm in location of the 90%, 50% and 10% transmission points respectively. The second short wavelength tolerance is preferably 557, 560, 563 +/−5 nm in location of the 90%, 50% and 10% transmission points respectively. The second long wavelength edge tolerance is preferably 575, 572 and 569 +/−3 nm in location of the 90%, 50% and 10% transmission points respectively. The filter may be used at normal incidence with +/−10 degree angle of incidence cone and be optimized for 5 degree angle of incidence. The filter shift with angle of incidence is about 2.3 nm. The filter may be used at a temperature of 140 degrees Celsius and the spectral shift is preferably less than or equal to 0.3 nm from 20 to 140 degrees Celsius.

Figure 6:
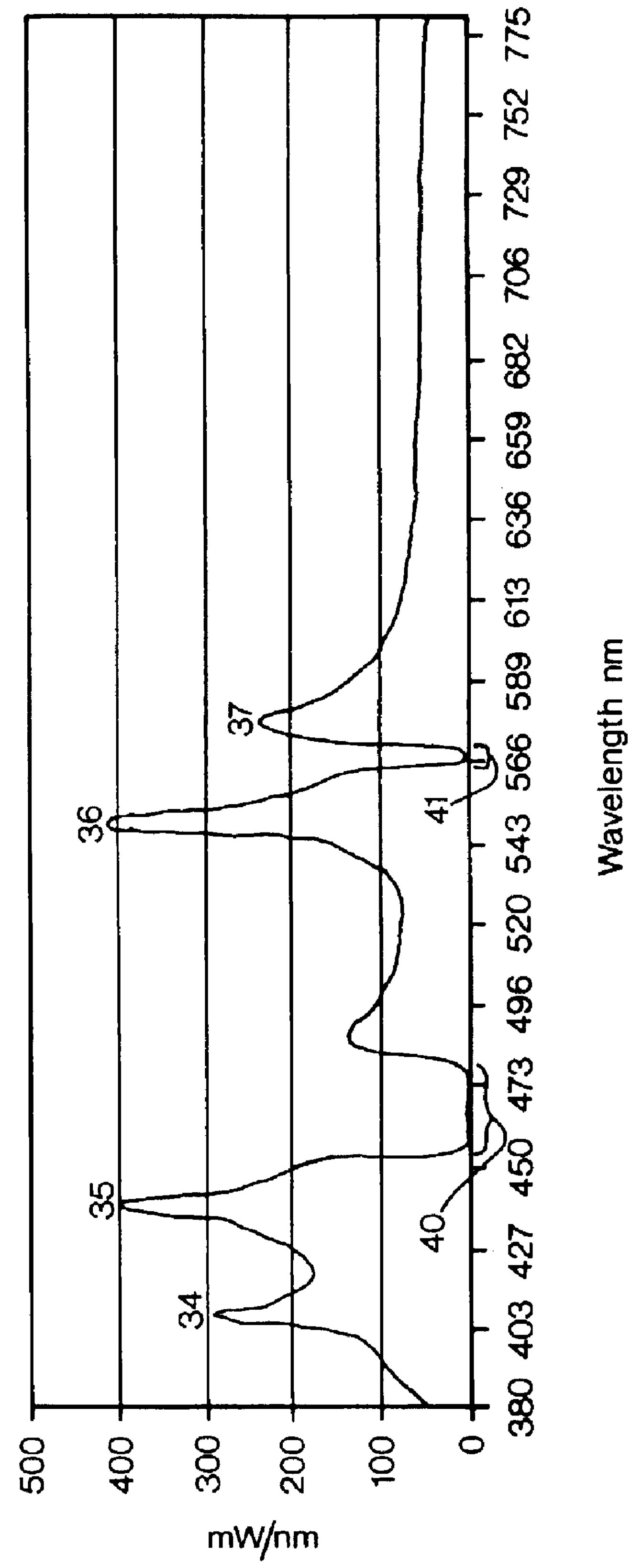
FIG. 6 is a spectral power density curve of a light source filtered by a notch filter of a third embodiment of the disclosure.

FIG. 6 shows the spectral power distribution of an ultra-high pressure mercury arc lamp filtered by a filter of the third preferred embodiment. Removing spectral energy from the range 40 at wavelengths higher than the first and second blue spikes 34–35 improves gamut. Removing green spectral energy from a range 41 between the first and larger green spike 36 and the second and smaller green spike 37 improves gamut. Leaving the spectral energy associated with at least the maxima of the two blue spikes 34–35 and the two green spikes 36–37 retains desired brightness.

Figure 7:
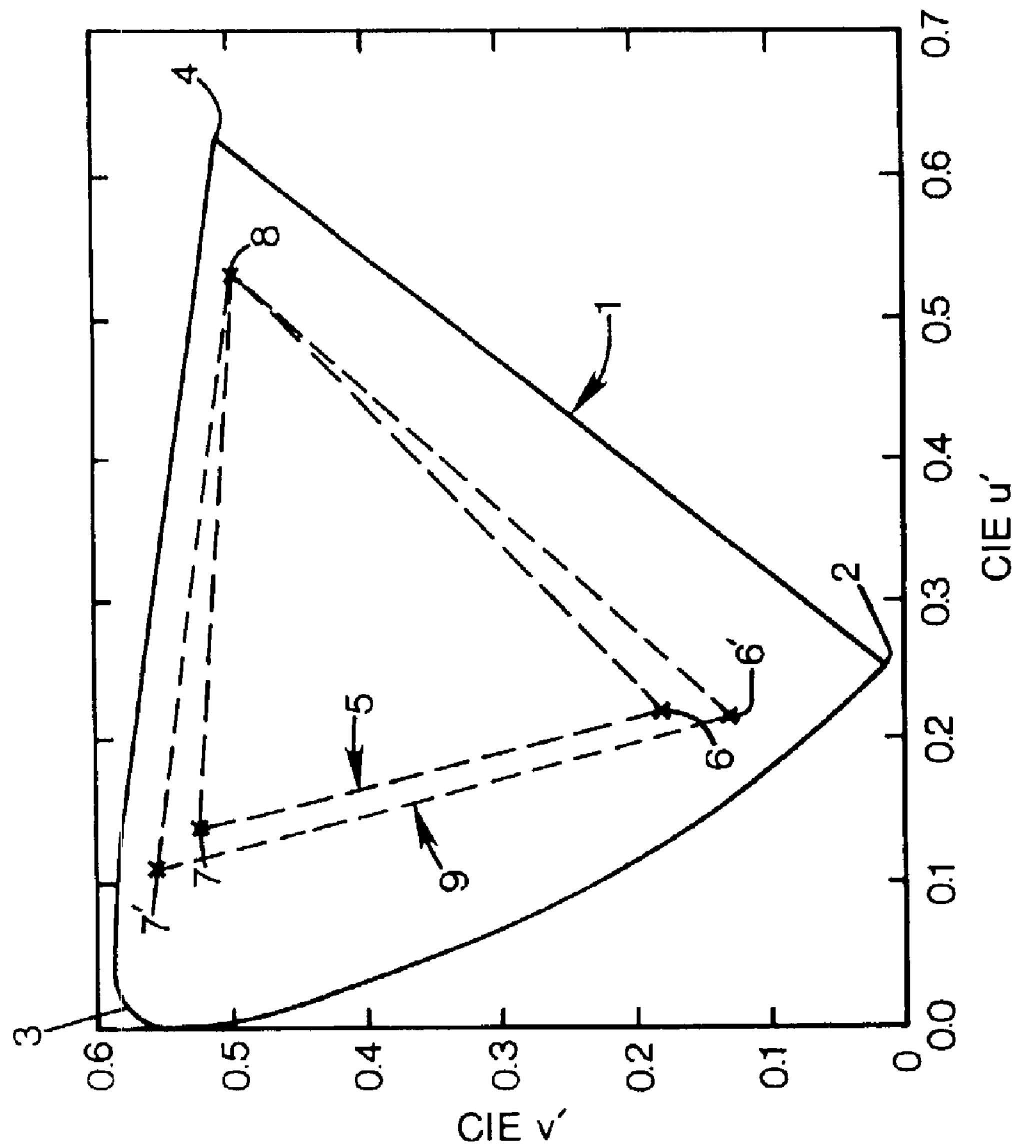
FIG. 7 is a chromaticity diagram showing the relative gamuts of a projector with a non-filtered light source and a light source filtered by an exemplary embodiment of the disclosure.

FIG. 7 shows a chromaticity diagram showing the relative increase in the gamut 5 of an exemplary projector with an ultra-high pressure mercury light source and notch filters of this disclosure in spectral ranges 40–41 in the blue and green spectral bands 31–32. The mix of colors in the filtered blue 6' and green 7' projected pixels have shifted outward from the non-filtered blue 6 and green 7 projected pixels, resulting in an improved gamut 9.

A filter or filters could be located a number of locations in the optical path to achieve the desired results. In preferred embodiments, filters may be packaged with a modulator unit, for example on a light inlet or light outlet window. Filters could also be located in the optical path inside the modulator unit, between the light source and the modulator or between the modulator and the image surface. A filter coating could be part of a light source assembly as a discrete filter, on one side of a window substrate, where it could be included with other filters such as UV or IR rejection filters, or as part of a bulb reflector coating or on filter wheel color segments, for example, on the back side of filter wheel color segments.

The exemplary embodiments discussed herein include particular filters which may improve the gamut of a particular light source. Persons of skill in the art will recognize that the general principles are applicable to other light sources and that the light sources discussed herein could be used with filters which remove energy in spectral ranges other than those discussed herein which improve gamut. Different filters and different filter combinations could be used with a given light source to achieve different desired gamuts for various applications.

Projectors suitable for use with filters of this disclosure may include any display devices such as near-to-eye display, digital projectors, rear projection televisions, computer monitors, advertising displays and other display devices that project modulated light onto a viewing surface and may include digital projectors.

Figure 8A:
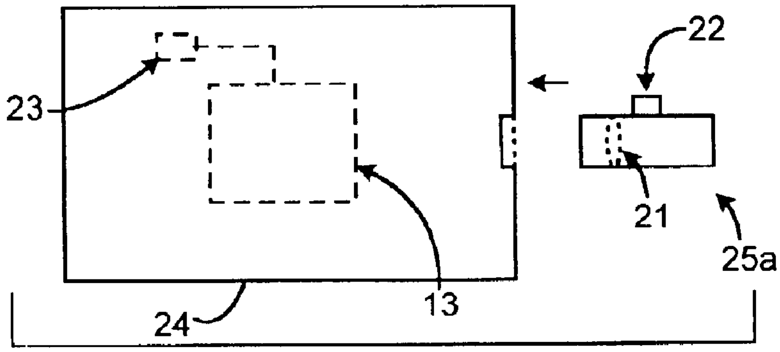
FIG. 8*a* is a diagram of a projector with an interchangeable lens assembly.
Figure 8B:
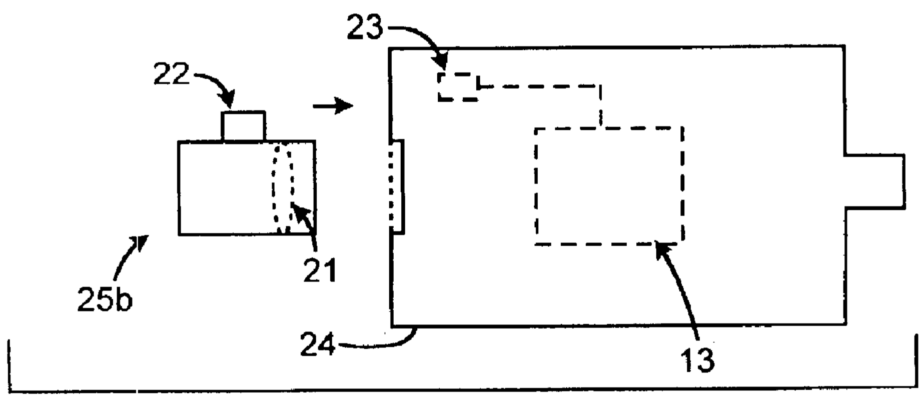
FIG. 8*b* is a diagram of a projector with an interchangeable light source assembly.
Figure 8C:
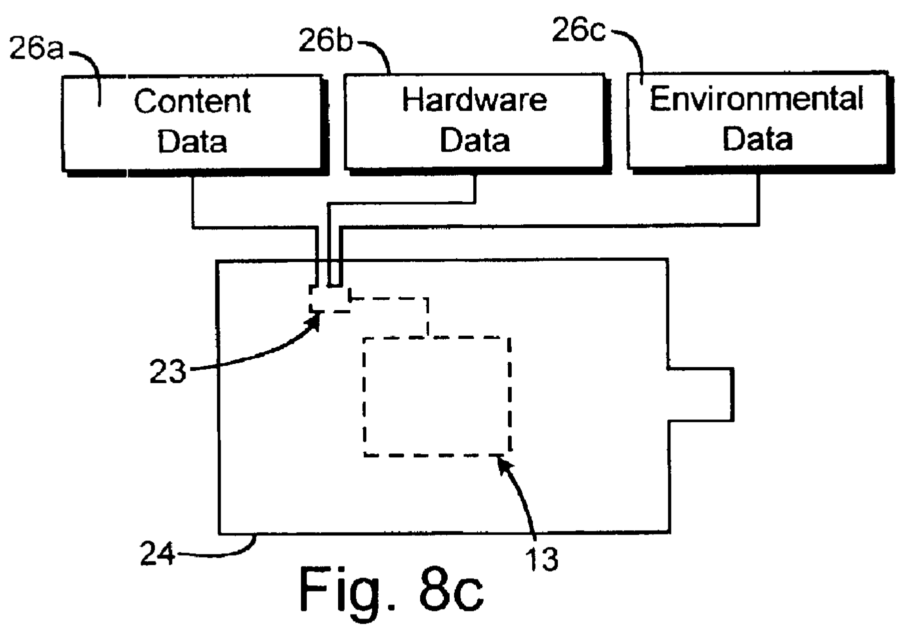
FIG. 8*c* is a diagram of a projector with a controller responsive to hardware data, content data and/or environmental data.

A digital projector could incorporate a Asmart@ filter system with a memory device 22 and software. The memory device could be included in by a flash-like chip or other conventional memory device. The memory device 22 (FIGS. 2, 8*a*, 8*b*) has stored data representing the characteristics of the filter. The filter data may be linked to a controller 23 (FIGS. 2, 8*a–c*) for the modulator. The controller 23 controls the modulator to modify the spectral output of the digital projector in response to the filter data an in accordance with the software.

The controller may also detect or receive data representing information on various hardware 26*b* (FIG. 8*c*) (to include data relating to the filter characteristics and/or the lamp type or lamp characteristics), display content 26*a* (e.g. whether the image to be displayed represents black & white spreadsheets, colored static power point slides or dynamic black & white or color video images) and environmental factors 26*c* (including the lighting environment of the room or viewing area in which the projector is being used or where the image is being displayed). The controller 23 may modify the spectral output of the digital projector 24 (FIG. 8*c*) in response to such hardware data 26*b*, content data 26*a* and/or environmental data 26*c*.

This smart filter system could detect the light source type being used in the projector, for example mercury or xenon spectrum, because the different spectrums require different filter designs. It will detect the display content as different filters may be used for different content as one may want to optimize the display for maximum brightness, maximum color fidelity, or a compromise between these two choices. The selection of which of the multiple filters to use may also depend upon the room irradiance levels on the screen and the chromaticity or color of this illumination.

A filter for use with a smart filter system may be mounted on a lens 21 (FIGS. 8*a*, 8*b*) which is interchangeable so that the controller 23 modifies the spectral output of the digital projector in response to the filter characteristics of the particular lens which is attached. The memory device 22 could be included as part of an interchangeable lens assembly 25*a*, 25*b* and the assembly and the projector could be designed such that the filter data is linked with the controller 23 when the lens assembly is in the installed position. The interchangeable assembly could be, for example, an interchangeable light source assembly 25*b* or an interchangeable projection lens assembly 25*a*.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A projector for projecting pixels to form an image onto an image surface in accordance with image data, comprising:

a light source for directing light along an optical path defined between the light source and the image surface;

a notch filter in the optical path of the light source wherein the notch filter is part of a reflector coating within the light source; and a controller for modifying the spectral output of the projector in response to at least one of hardware data, content data or environmental data.

2. The projector of claim 1, further comprising:

a memory device with hardware data of the notch filter linked to the controller.

3. The projector of claim 2 wherein the memory device is attached to the notch filter thereby creating a smart filter.

4. A projector for projecting pixels to form an image onto an image surface in accordance with image data, comprising:

a light source for directing light along an optical path defined between the light source and the image surface;

a notch filter in the optical path of the light; a controller for modifying the spectral output of the projector in response to at least one of hardware data, content data or environmental data; and a projection lens that is interchangeable with the projector and wherein the notch filter is mounted on the lens.

5. The projector of claim 4, further comprising:

a memory device with hardware data of the notch filter linked to the controller wherein the memory device is mounted on the lens.

6. A projector for projecting pixels to form an image in accordance with image data, comprising:

a light source;

a notch filter in the optical path of the light source; and a controller including a memory device with hardware data of the notch filter linked to the controller for modifying the spectral output of the projector in response to at least one of hardware data, content data or environmental wherein the memory device and notch filter are mounted to the light source and wherein the light source is interchangeable with the projector.

7. The projector of claim 6 wherein the light source includes a bulb reflector coating and the notch filter is part of the bulb reflector coating.

8. A projector for projecting pixels to form an image onto an image surface in accordance with image data, comprising:

a light source for directing light along an optical path defined between the light source and the image surface;

a notch filter in the optical path of the light; a controller for modifying the spectral output of the projector in response to at least one of hardware data, content data or environmental data; and a modulator and wherein the notch filter is located in the optical path inside the modulator unit.

9. A projector for projecting pixels to form an image onto an image surface in accordance with image data, comprising:

a light source for directing light along an optical path defined between the light source and the image surface;

a notch filter;

a controller for modifying the spectral output of the projector in response to at least one of hardware data, content data or environmental data; and a modulator and wherein the notch filter is located in the optical path of light between the modulator and the image surface.

10. A projector for projecting pixels to form an image onto an image surface in accordance with image data, comprising:

a light source for directing light along an optical path defined between the light source and the image surface;

a notch filter in the optical path of the light; a controller for modifying the spectral output of the projector in response to at least one of hardware data, content data or environmental data; and a filter wheel having color segments and wherein the notch filter is located on the color segments of the filter wheel.

11. The projector of claim 10 wherein the notch filter is located on the back side of the color segments of the filter wheel.

* * * * *

UNITED STATES PATENT AND TRADEMARK OFFICE

CERTIFICATE OF CORRECTION

PATENT NO. : 6,956,702 B2
APPLICATION NO. : 10/423371
DATED : October 18, 2005
INVENTOR(S) : Pate It is certified that error appears in the above-identified patent and that said Letters Patent is hereby corrected as shown below:

IN THE CLAIMS

Col. 8 (line 18), after “environmental”, insert --data--.

Signed and Sealed this

Fifth Day of February, 2008

JON W. DUDAS
*Director of the United States Patent and Trademark Office*